United States Patent [11] 3,577,120

[72] Inventor Archie T. Sherbert, Jr.
 Media, Pa.
[21] Appl. No. 767,182
[22] Filed Oct. 14, 1968
[45] Patented May 4, 1971
[73] Assignee The Boeing Company
 Seattle, Wash.

[54] DISPLAY SYSTEM FOR USE IN VTOL-TYPE AIRCRAFT
 15 Claims, 6 Drawing Figs.
[52] U.S. Cl. .................................................. 340/27,
 343/108, 235/150.22, 340/24
[51] Int. Cl. ....................................................... B64d 45/04
[50] Field of Search............................................ 340/27
 (All); 235/150.23; 235/150.22; 343/108 (SI);
 343/108; 356/251, 252; 353/11—14

[56] References Cited
 UNITED STATES PATENTS
 3,355,733 11/1967 Mitchell et al. ................ 340/27
 3,400,364 9/1968 Musgrave et al. .............. 340/24
 2,960,906 11/1960 Fogel............................. 353/12
 3,324,471 6/1967 Rover, Jr. ...................... 343/108
 3,387,302 6/1968 Bevon .......................... 343/108

*Primary Examiner*—Kathleen H. Claffy
*Assistant Examiner*—Jan S. Black
*Attorneys*—Robert J. McDonnell and Albert W. Hilburger

ABSTRACT: A system for displaying information relating to the operation of a vehicle, such as an aircraft. An integrated approach/hover indicator provides a pictorial representation of an intended landing site for the aircraft and indicates the position of the aircraft relative to the landing site and relative to a preselected path leading to the landing site. The pictorial representation is displayed in proper perspective such that a pilot viewing the instrument would think he is actually viewing the landing site. In addition, the instrument provides digital readout and other devices which visually display a number of operating values relating to the performance of the aircraft.

PATENTED MAY 4 1971 3,577,120

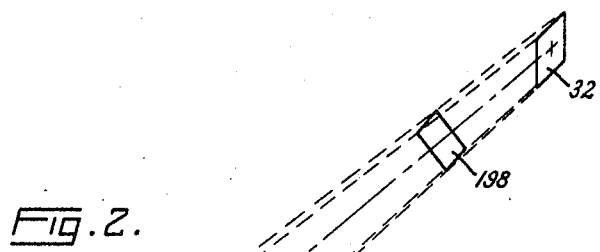
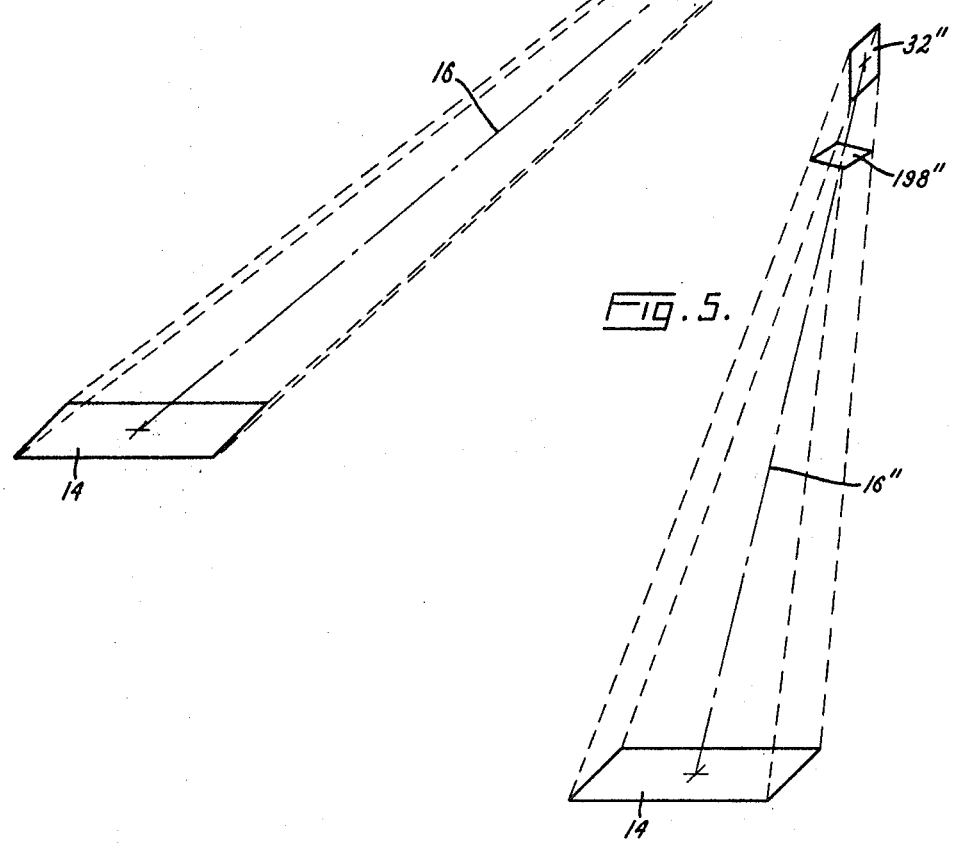
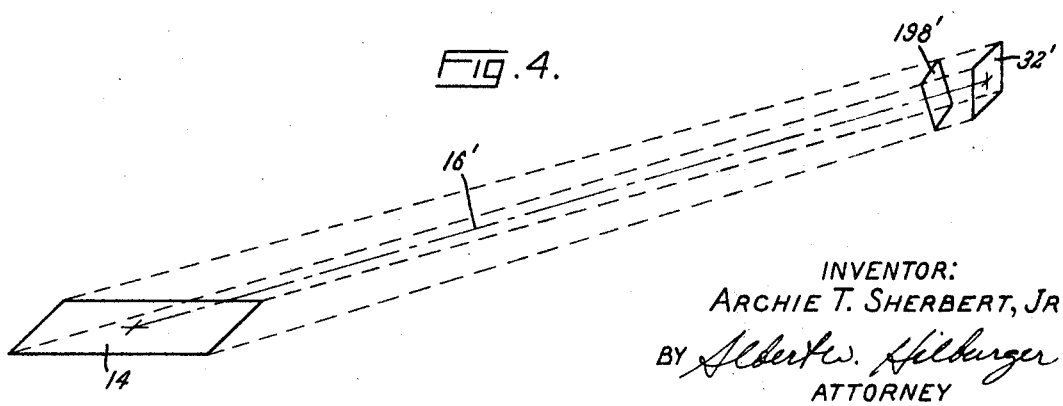

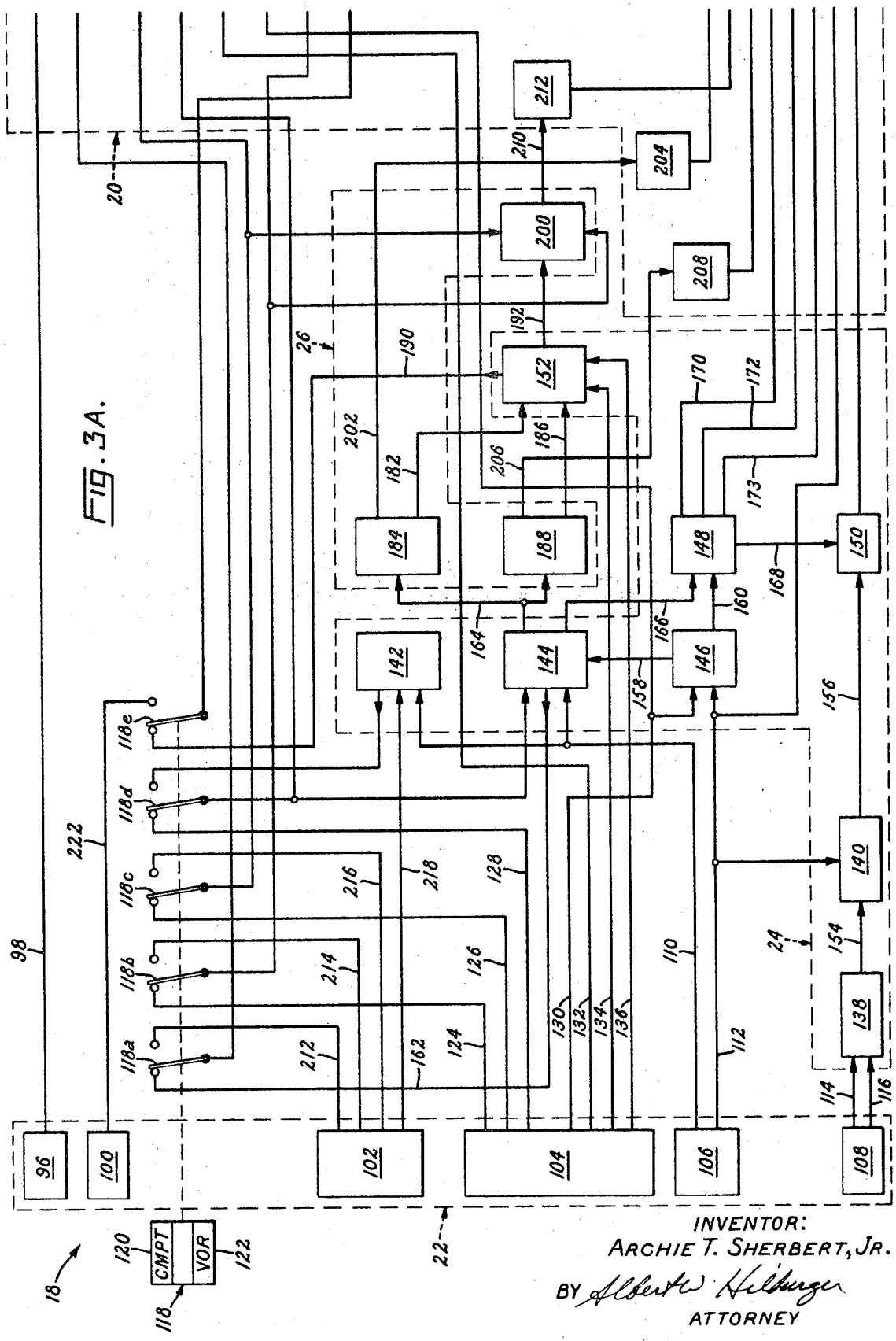

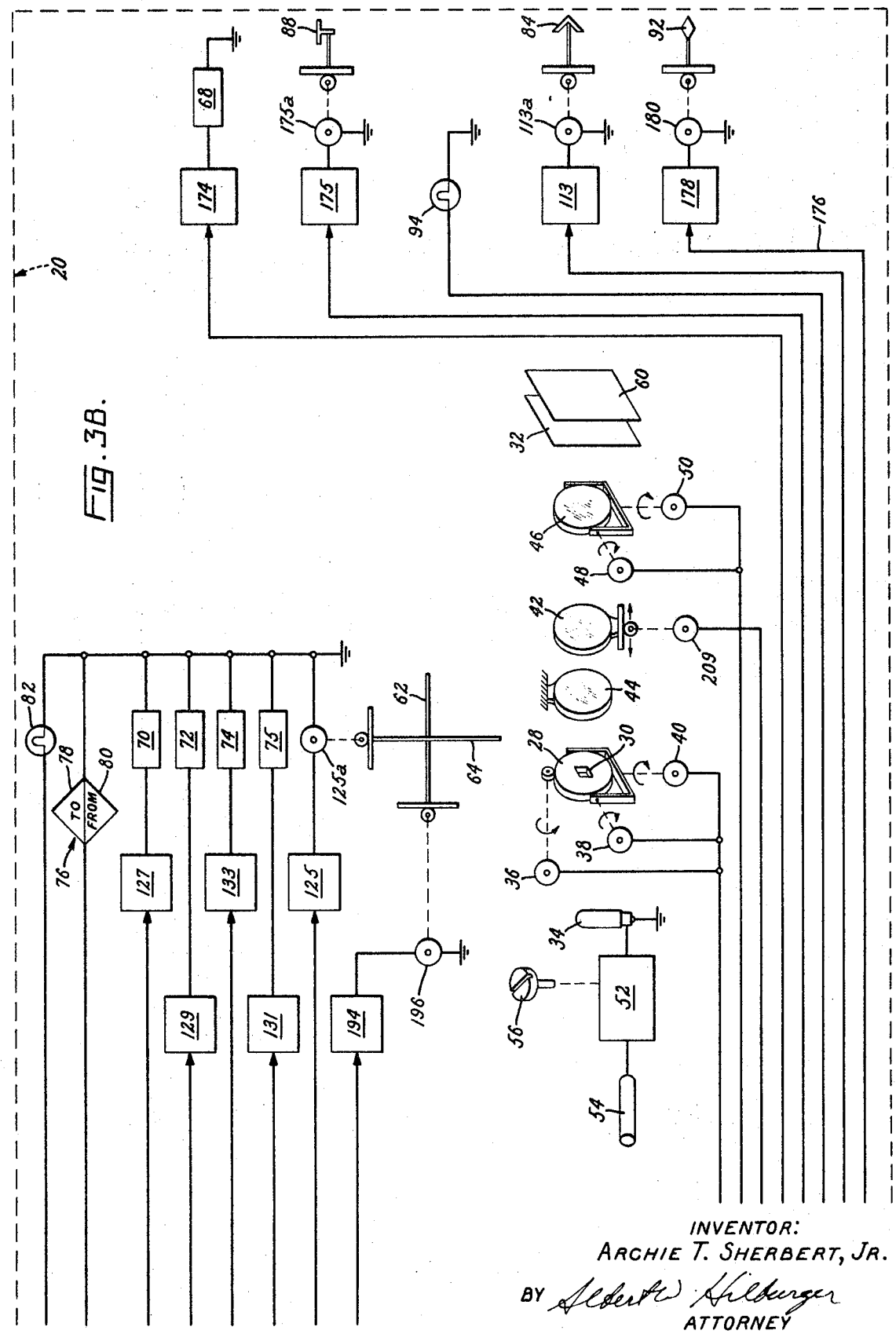

DISPLAY SYSTEM FOR USE IN VTOL-TYPE AIRCRAFT

The invention relates generally to a system for displaying information relating to the operation of a vehicle, such as an aircraft, and particularly relates to such a system which is especially adaptable to the operation of a vertical takeoff and landing (VTOL) aircraft.

Although the instrument herein disclosed is described with respect to its application to an aircraft, it is to be understood that the invention is not to be so limited for the reason that the instrument is applicable to all vehicles which operate in a manner similar to an aircraft.

In the early days of manned flight, few instruments were required to provide information relating to various operating conditions of the aircraft. However, as aircraft speed increased and aircraft became more complex, it was necessary to increase the number of instruments in the aircraft so as to adequately provide for the pilot a visual display of the primary operating conditions of the aircraft. Eventually, the number of instruments in the aircraft became so numerous that in some instances it was even necessary to add a special crew member such as a flight engineer to monitor these instruments. In some instances, interrelated information was provided on widely separated instruments such that a pilot who, for example, desired to know at a given instant his course, range, and ground speed, was forced to scan the instrument panel in order to correlate the information from these instruments. Such activity on the part of the pilot consumed valuable time during which he could be performing other necessary operations.

Although recent years have been witness to significant advances in the design and construction of VTOL vehicles such as rotary wing, tilt-wing, tilt-rotor, and ducted fan aircraft, the design and construction of flight instruments for these aircraft have lagged to a considerable degree. For example, it has been common practice in VTOL aircraft to employ conventional aircraft instruments with little or no modification. In such instances, pilots of VTOL vehicles have been constrained in the operation of these aircraft. Additionally, the problems of VTOL operations have been complicated further by the military requirement to operate in remote areas where radio aids to navigation are inadequate.

The present invention relates to an instrument which has been designed specifically for VTOL aircraft and therefore enables the pilot to fly in accordance with the flight parameters of that particular type of aircraft. In addition, this instrument has been designed to take advantage of the inherent capabilities of modern airborne navigational computers when operating in the aforementioned remote areas. To this end, a display instrument is disclosed which provides a pictorial representation of an intended landing site and which indicates the position of the aircraft relative to the landing site and relative to a preselected path leading to the landing site. A pictorial representation or analog, for example, of a 100 feet by 100 feet landing site as it would be seen by the pilot under visual conditions is displayed on a viewing screen. The size, shape, and position of the analog change with respect to a reticle centrally marked on the viewing screen to indicate the aircraft's relative position as its position changes with respect to the intended landing site. Horizontal and vertical cross-pointers provide off-course during approach and hover, and the viewing screen is so scaled that the analog of the landing site entirely fills the screen when the aircraft is exactly in the center of and touching the intended landing site. The display may be driven by inputs from either a navigation computer or from electronic landing aids. Digital display of coarse time-to-go, course-to-destination, range-to-destination, ground speed, and drift angle are provided along with a TO-FROM indicator, a marker beacon, and mode indications. A vertical velocity indicator immediately adjacent the viewing screen permits interplay of vertical velocity and vertical off-course displacement. Also to one side of the viewing screen, a fine time-to-go indicator is incorporated, which decreases to touchdown during the last minute of flight.

Accordingly, it is a primary object of the invention to provide a new and improved system for displaying information relating to the operation of a vehicle.

Another object of the invention is the provision of a new and improved aircraft instrument which relates specifically to the operation of VTOL aircraft.

A further object of the invention is to provide a new and improved aircraft instrument adapted to provide a pictorial representation of a preselected landing site. A related object is to provide such an instrument which indicates the position of the aircraft relative to the landing site. Another related object is to provide such an instrument which indicates the position of the aircraft relative to a preselected path leading to the landing site.

Still another object of the invention is the provision of a new and improved aircraft instrument adapted to provide a pictorial representation of a landing site and capable of maintaining the pictorial representation in proper perspective with respect to a viewing plane oriented substantially perpendicular to the path of the vehicle.

Yet another object of the invention is the provision of a new and improved aircraft instrument which provides a pictorial representation on a viewing screen of a preselected landing site and includes a mechanism for indicating the relationship between the present position of the aircraft and a desired position of the aircraft.

Other and further objects and advantages of the invention will be apparent or will be described in the following specification taken together with the accompanying drawings.

In the drawings, in which like numerals refer to like parts throughout:

FIG. 2 is a perspective view schematically illustrating the relationship between the instrument in flight and a preselected landing site, and indicating a moderate approach angle;

FIGS. 3A and 3B illustrate successive portions of a schematic block diagram of a system suitable for operating the instrument shown in FIG. 1;

FIG. 4 is a perspective view similar to FIG. 2 but indicating a shallow approach angle; and FIG. 5 is a perspective view similar to FIGS. 2 and 4 but indicating a steep approach angle.

Figure 1:
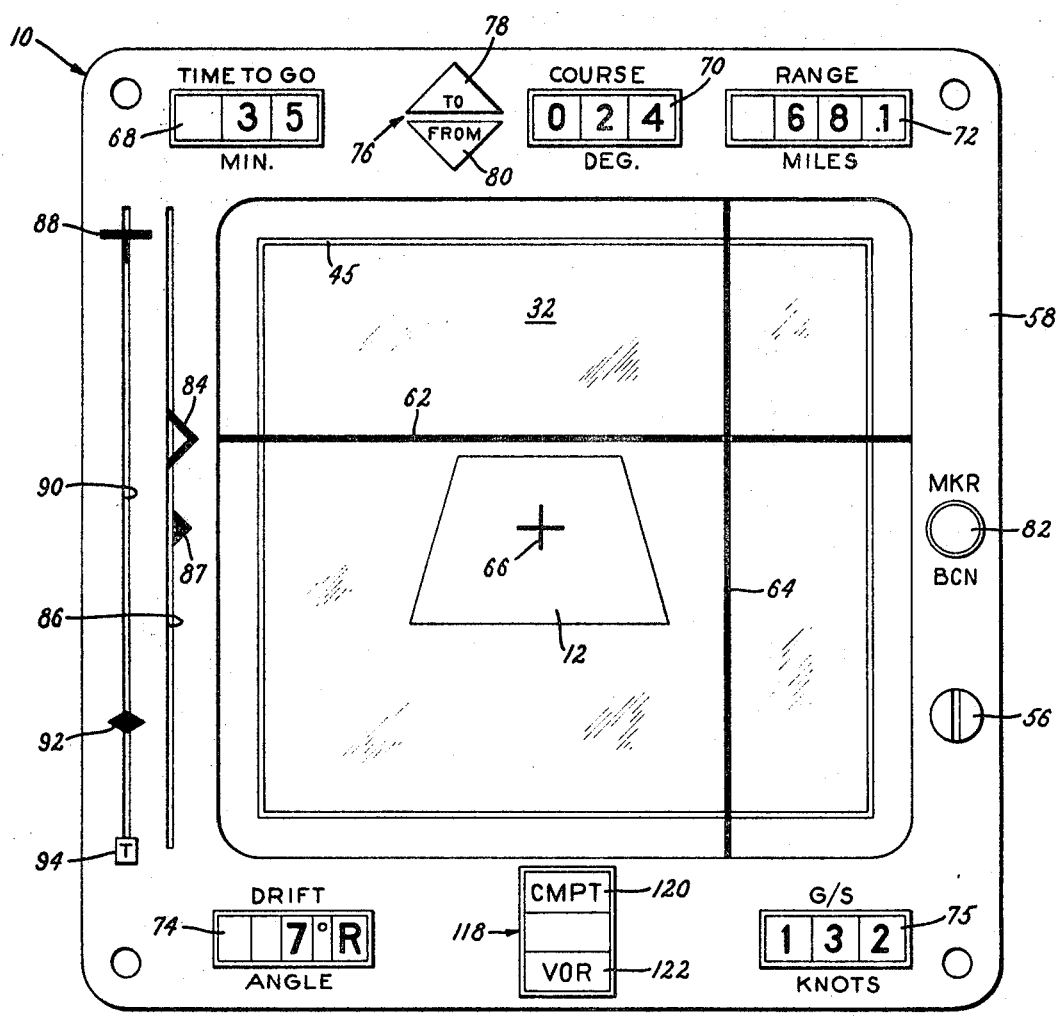
FIG. 1 is a front elevation view of an instrument embodying the principles of the invention.

Refer now to the drawings and initially to FIG. 1 which illustrates an instrument 10 which embodies the principles of the invention. When the pilot of an aircraft (not shown) utilizing the instrument 10 is operating under Instrument Flight Rules (IFR) conditions, the instrument is effective to artificially generate an image 12 of a typical intended landing site 14 (FIG. 2) as it would appear if the aircraft were operating under Visual Flight Rules (VFR) conditions. The instrument 10 further provides a visual display of the aircraft's position with respect to a desired flight path 16 and with respect to the landing site 14 as well as indicating the most efficient route for the aircraft to travel in order to reach the landing site from its present position. In FIG. 3 (hereinafter, FIGS. 3A and 3B will be referred to collectively as FIG. 3), a suitable system 18 is illustrated which determines various types of flight information for display by the instrument 10, and this system is further subdivided into a plurality of subsystems including a display subsystem 20, an input subsystem 22, a computational subsystem 24, and a generating subsystem 26.

At the outset, consider the display subsystem 20. As illustrated schematically in FIG. 3, a masking member or plate 28 is provided with a window 30, preferably of square configuration, which serves as an analog of the landing site 14 for the aircraft when projected as the image 12 (FIG. 1) upon a screen 32 by a lamp 34. The masking plate 28 is mounted for movement about three orthogonally oriented axes. A first synchro motor 36 serves to rotate the masking plate 28 about a longitudinal axis, a second synchro motor 38 rotates the plate about a lateral axis, and a third synchro motor 40 rotates the plate about a vertical axis. It should be apparent that the image 12 of the window 30 appearing on the screen 32 is of a square configuration only when the masking plate 28 lies in a plane parallel to a plane of the screen. In all other relative positions between the masking plate 28 and the screen 32, the image 12 would appear to be trapezoidal in shape (see FIG. 1). A pair of enlarging lenses 42 and 44 are located intermediate the masking plate 28 and the screen 32. The lens 42 is movable relative to the lens 44 to permit adjustment of the size of the image 12 on the screen 32 in proportion to the distance of the aircraft from the landing site 14. Movement of the lens 42 is so scaled that the image 12 at one extreme of movement appears as a dot on the screen 32 and at the other extreme of movement appears to fill the area of the screen enclosed by a suitably engraved BOUNDARY mark 45. A movable positioning lens 46 is similarly provided between the masking plate 28 and the screen 32 to permit vertical and horizontal adjustment of the image 12 on the screen, also in proportion to the position of the aircraft relative to the landing site 14. One synchro motor 48 serves to rotate the positioning lens 46 to produce vertical displacement of the image 12 on the screen 32 and another synchro motor 50 serves to rotate the positioning lens to produce a lateral displacement of the image 12 on the screen 32. The intensity of light from the lamp 34 may be automatically adjusted by means of a control device 52 which is informed about the intensity of ambient light in the vicinity of the instrument 10 from an intensity sensor 54. Additionally, a selector knob 56 on a front panel 58 of the instrument can be manually operated to adjust the contrast of the image 12 on the screen 32. Undesirable reflections appearing on the screen can be reduced by use of a suitable filter 60.

Horizontal and vertical cross-pointers 62 and 64, respectively, are suitably provided to indicate at their point of intersection a desired position of the aircraft with respect to an actual position of the aircraft as indicated by a reticle 66 (FIG. 1) suitably provided substantially in the center of the screen 32. The vertical cross-pointer 64 always indicates the lateral displacement of the desired aircraft position relative to the reticle 66. When the aircraft is distant from the landing site 14, the horizontal cross-pointer 62 is effective to indicate vertical displacement of the desired aircraft position relative to the reticle 66, but as the aircraft approaches the landing site 14, the horizontal cross-pointer simultaneously indicates both vertical and longitudinal displacement of the desired aircraft position relative to the reticle 66. Furthermore, when the aircraft is positioned directly over the landing site 14, the horizontal cross-pointer 62 indicates only longitudinal displacement of the desired aircraft position relative to the reticle 66.

Other information provided by the instrument 10 includes a plurality of digital readout devices mounted on the first panel 38. These include a coarse time-to-go display 68 to indicate the time remaining, in minutes, until touchdown; a course display 70 which indicates selected direction, in degrees, toward the landing site 14; a range display 72 which indicates distance between the aircraft and the landing site in miles and tenths of miles; a drift angle display 74 which indicates drift of the aircraft in degrees to the right and to the left; and a ground speed display 75 which indicates speed, in knots, of the aircraft relative to the ground. To provide an instantaneous indication of whether the aircraft is approaching or retreating from the landing site 14, a TO-FROM indicator 76 has one portion 78 appropriately marked TO and another portion 80 appropriately marked FROM, and when the appropriately marked portion is lighted, the pilot is notified accordingly. A marker beacon lamp 82 is suitably lighted when the aircraft passes over one of a network of predetermined ground positions. At all times during the operation of the aircraft, a vertical speed pointer 84 is movable along a slot 86 to indicate, qualitatively, the speed of the aircraft in a vertical direction, with a reference marker 87 located coextensive with the horizontal portion of the reticle 66 for the purpose of indicating zero vertical velocity. A fine time-to-go pointer 88 is movable along a vertical slot 90 adjacent the slot 86 to count down the time remaining during the last 60 seconds before touchdown. At such time that the pointer 88 moves past a low-limit pointer 92, the pilot is informed that a preselected arbitrary altitude (hereinafter referred to as "low-limit altitude") has been reached and may be employed to indicate that touchdown of the aircraft is imminent. Upon touchdown, a suitable lamp 94 is lighted.

Consider now, with reference to FIG. 3, the input subsystem 22 which includes several input devices responsive to the operation of the aircraft to provide appropriate information to the instrument 10.

The input subsystem 22 includes a marker beacon receiver 96, one example of which is the Bendix MKA-28. Throughout operation of the aircraft over territory equipped with appropriate transmitting facilities, the marker beacon receiver 96 generates a signal represented by a conductor 98 which energizes the lamp 82 on the front panel 58. In a conventional manner, the receiver 96 responds to a ground-based signal in the vicinity of the aircraft to indicate that the aircraft is in a particular position relative to the ground, and receipt of this signal is indicated upon lighting of the lamp 82. Other components of the input subsystem 22 include a glide slope receiver 100, one example of which is the Bendix GSA-25B; a radio navigation device 102, which may be any one of the following: VOR/DME (VHF Omni-Range and Distance Measuring Equipment), TACAN (Tactical Aid to Air Navigation), or VOR-TAC (a combination of VOR/DME and TACAN) examples of which are the Bendix NVA-22A (VOR) and the Bendix DMA-29 (DME): a navigation computer 104, one example of which is the Bendix CPA-24B; a barometric altimeter 106, one example of which is the Bendix Type 31104; and a radar altimeter 108, one example of which is the Bendix Type 31104; and a radar altimeter 108, one example of which is the Bendix ALA-S1. During operation of the input subsystem 22, the barometric altimeter 106 generates a barometric altitude signal represented by a conductor 110, and an altitude rate signal represented by a conductor 112. Although other functions of the altitude rate signal 112 will be subsequently described, one function is to energize a drive mechanism 113 for operating a synchro motor 113a to position the vertical speed pointer 84 along the slot 86. Similarly, the radar altimeter 108 generates an absolute or radar altitude signal 114, and a low-limit altitude signal represented by a conductor 116 may be suitably developed by the altimeter 108 upon manual adjustment by the pilot of the aircraft. It is noteworthy that the signals from the marker beacon receiver 96, from the barometric altimeter 106, and from the radar altimeter 108 are continuously provided to the remaining subsystems 20, 24, and 26. However, it is selectively determined whether signals provided to the remaining subsystems are primarily received from the navigation computer 106 in one instance or from the glide slope receiver 100 together with the radio navigation device 102 in the other instance. When the remaining subsystems receive signals primarily from the navigation computer 104, the system 18 is said to be in the "Computer Mode" and when the remaining subsystems receive signals primarily from the glide slope receiver 100 together with the radio navigation device 102, the system 18 is said to be in the "VOR Mode." The pilot of the aircraft can select either the computer mode or the VOR mode by means of a suitable switch 118 mounted on the front panel 58. Obviously a determining factor in the selection of the operating mode is the availability of appropriate radio aids to navigation. The switch 118 is preferably provided with a pair of buttons 120 and 122, respectively marked CMPT and VOR to indicate the particular mode of operation of the system 18. The switch 118 is effective to operate a plurality of ganged contacts, numbered 118a through 118e, and in the positions shown in FIG. 3, the contacts are positioned for the computer mode.

In the ensuing description of the system 18, ti will first be assumed that the system is operating in the computer mode; subsequently, the system 18 will be described with the assumption that it is operating in the VOR mode.

A plurality of output signals are generated by the navigation computer 104, and in FIG. 3, each of these signals is represented by an individual conductor. Thus, a signal of Y-position (i.e., lateral position) error is represented by a conductor 124 and, via the contact 118b, energizes a drive mechanism 125 which operates a synchro motor 125a to move the vertical cross-pointer 64 across the screen 32; an aircraft course signal is represented by a conductor 126 and, via the contact 118c, energizes a drive mechanism 127 which operates the course display 70; a ground range signal is represented by a conductor 128 and, via the contact 118d, energizes a drive mechanism 129 which operates the range display 72; a ground speed signal is represented by a conductor 130 and energizes a drive mechanism 131 to operate the ground speed display 75; a drift angle signal is represented by a conductor 132 and energizes a drive mechanism 133 to operate the drift angle display 74; a Z-positon (i.e., vertical position) error signal is represented by a conductor 134; and an X-position (i.e., longitudinal position) error signal is represented by a conductor 136. It is noteworthy that the position error signals 124, 134, and 136 refer, respectively, to errors in aircraft position relative to the desired flight path 16 (FIG. 2).

Consider now the computational subsystem 24 whose components receive many of the signals generated by the navigation computer 104, the barometric altimeter 106, and the radar altimeter 108. Specific components of the subsystem 24 include a vertical range computer 138, a vertical closure time computer 140, a ground range computer 142, a flight vector computer 144, a velocity vector computer 146, a closure time computer 148, a time difference computer 150, and a viewing plane analyzer 152. Each of these computers is composed of suitable electronic circuits which perform both logical and computational operations.

The vertical range computer 138 receives the radar altitude signal 114 and the low-limit signal 116 from the radar altimeter 108 and performs a subtraction operation such that an output signal, represented by a conductor 154, represents vertical range between the present position of the aircraft and the value of low-limit altitude which had previously been manually preset into the radar altimeter 108. The vertical closure time computer 140 compares the signal 112 with the signal 154 and generates an output signal represented by a conductor 156 which is indicative of the time required for the aircraft to reach the low-limit altitude.

The velocity computer 146 receives the altitude rate signal 112 from the barometric altimeter 106 and the ground speed signal 130 from the navigation computer 104. The computer 146 operates upon these signals to develop a velocity vector for the aircraft and transmits this information to the flight vector computer 144 in a signal represented by a conductor 158, and the closure time computer 148 receives similar information in a signal represented by a conductor 160. In addition to the signal 158 from the velocity vector computer 146, the flight vector computer 144 receives the altitude signal 110 from the barometric altimeter 106 and the ground range signal 128 from the navigation computer 104. These signals are suitably operated upon by the computer 144 and result in output signals represented, respectively, by conductors 162, 164, and 166. The signal 162, via contact 118a, results from a comparison of the velocity vector signal 158 with the altitude signal 110 and with the ground range signal 128, and suitably energizes the TO-FROM indicator 76 on the front panel 58. In response, the appropriate portion of the indicator 76 is lighted, thereby informing the pilot, at a glance, whether the aircraft is approaching the desired destination or is departing from the destination. The signals 164 and 166 provide information relating to the track and the desired track of the aircraft in polar cordinates.

In the computer mode, the ground range computer 142, although operating, does not provide any signal to the system 18.

The closure time computer 148 receives the signal 160 from the velocity vector computer 146 and the signal 166 from the flight vector computer 144, and generates various output signals represented, respectively, by conductors 168, 170, 172, and 173, all of which provide information relating to time for the aircraft to reach its desired destination. The signal 170 corresponds to the time required for the aircraft to descend from its present altitude to touchdown and energizes a suitable drive mechanism 174 to position the digital readout 68 of coarse time-to-go. The signal 172 corresponds to the time required for the aircraft to proceed from its present altitude to touchdown during the last minute of flight only and energizes a suitable drive mechanism 175 which operates synchro motor 175a to position accordingly the fine time-to-go pointer 88. The signal 174 is present only when time-to-go is equal to zero and is used to energize the lamp 94.

The time difference computer 150 subtracts the signal 156 from the signal 168 and thus generates an output signal represented by a conductor 176. The signal 176 corresponds to the time difference between time to touchdown and time to the low-limit altitude and energizes a suitable drive mechanism 178 to operate a synchro motor 180 to properly position the low-limit pointer 92 along the slot 90 (FIG. 1).

The viewing plane analyzer 152 receives a first input signal represented by a conductor 182 from an approach angle detector and perspective generator 184 and a second input signal represented by a conductor 186 from a range detector and size generator 188. Each of the devices 184 and 188 is a component of the generating subsystem 26 which subsequently will be described in detail. The analyzer 152 further receives the Z-position error signal 134 and the X-position error signal 136 from the navigation computer 104 and operates upon all of the input signals to provide output signals represented, respectively, by conductors 190 and 192. The signal 190, via contact 118e, serves to energize a suitable drive mechanism 194 for operating a synchro motor 196 to drive the horizontal cross-pointer 62 in a vertical plane across the screen 32. The analyzer 152, in the course of its operation, determines the orientation of an imaginary viewing plane 198 (FIG. 2) relative to the landing site 14. The viewing plane 198 which always lies perpendicular to the flight path 16 is characterized by the masking plate 28. To this end, the masking plate 28 is continuously driven so that its projected image appears as if located in the viewing plane 198. Additionally, the analyzer 152 determines, proportionately, the relative values of the signals 134 and 136 to be used to drive the masking plate 28 and the horizontal cross-pointer 62.

Consider now the generating subsystem 26 in FIG. 3. The subsystem 26 includes an approach angle detector and perspective generator 184 and a range detector and size generator 188, both of which have been discussed previously, as well as a position and orientation generator 200. The generator 184 receives the signal 164 from the flight vector computer 144 and after operation upon the signal generates the output signal 182 representing approach angle of the aircraft and directed toward the viewing plane analyzer 152. Another output signal from the generator 184, represented by a conductor 202, energizes a perspective drive mechanism 204 for operating the synchro motors 36, 38, and 40. In this manner, the shape of the image 12 appearing on the screen 32 is developed in accordance with the actual position of the aircraft in space relative to the landing site 14. The generator 188 likewise receives the signal 164 from the flight vector computer 144 and operates upon the signal to generate output signals 186 and 206 which relate to the distance of the aircraft from the landing site 14 and therefore to the size of the image 12 on the screen 32. The signal 186 is directed toward the viewing plane analyzer 152, as previously described, and the signal 206 energizes an enlarger drive mechanism 208 for operating a synchro motor 209 to adjust the lens 42 to vary the size of the image 12 according to the distance of the aircraft from the landing site 14. Receiving from the analyzer 152 a signal 192 relating to the proper mix of X and Z-position error signals, as well as the Y-position error signal 124 and the course signal 126 from the navigation computer 104, the generator 200 generates a signal represented by a conductor 210 to energize a positioning drive mechanism 212 which operates the synchro motors 48 and 50 accordingly. Thus, the generator 200 determines the lateral displacement and the vertical displacement of the image 12 relative to the reticle 66 on the screen 32.

Consider now operation of the system 18 in the VOR mode; that is, after the button 122 has been pressed. All operations previously described remain substantially unchanged when the glide slope receiver 100 and the radio navigation device 102 are actively connected into the system via the switch 118 in place of the navigation computer 104. Of course, it is understood that various components in the system 18 continue to receive signals from either the navigation computer 104 or from the radio navigation device 102 regardless of the particular mode then operating. Therefore, when the system 18 is operating in one mode, that mode is to be considered a primary mode and the other a secondary mode, and vice versa. In the VOR mode, the TO-FROM indicator 76 is energized from the radio device 102 by a signal represented by a conductor 212 via the contact 118a. Further, instead of receiving the Y-position error signal 124 from the navigation computer 104, the generator 200 receives a Y-position error signal represented by a conductor 214 from the radio device 102 via the contact 118b. The Y-position error signal 214 is also effective to energize the drive mechanism 125 for moving the vertical cross-pointer 64 in place of the corresponding signal 124 from the navigation computer 104. In addition, the generator 200 receives a bearing signal represented by a conductor 216 via a contact 118c instead of the course signal 126 from the navigation computer 104. The bearing signal 216 is also effective to energize the drive mechanism 127 for operating the course display 70. The ground range computer 142 receives a slant range signal represented by a conductor 218 from the radio navigation device 102 and operates upon the slant range signal 218 and upon the altitude signal 110 from the barometric altimeter 106 to generate an output signal 220 directed toward the flight vector computer 144 via the contact 118d and disconnecting from the computer 144 the ground range signal 128 from the navigation computer 104. The output signal 220 also energizes the range counterdrive mechanism 129 for appropriately adjusting the range display 72. In the VOR mode, the drive mechanism 194 for the horizontal cross-pointer 62 is energized by a signal represented by a conductor 222 from the glide slope receiver 100 via the contact 118e in place of the signal 190 from the analyzer 152 when operation is in the computer mode.

In operation, the reticle 66 on the screen 32 represents the present position of the aircraft according to information received from the input subsystem 22. At their point of intersection, the cross-pointers 62 and 64 indicate where the aircraft would be if it were to follow the selected flight path 16 to the landing site 14. Therefore, the pilot attempts to maneuver his aircraft in a direction which assures movement of the reticle 66 to the point of intersection of the cross-pointers 62 and 64. In actuality, the reticle 66 remains stationary on the screen 32 and the cross-pointers 62 and 64 move relative to the screen. Hence, when the flight path of the aircraft coincides with the flight path 16, the cross pointers 62 and 64 are contiguous with the reticle 66.

As the aircraft approaches the landing site 14, the image 12 increases in size on the screen 32. When a center of the image 12 is substantially displaced from the reticle 66, the pilot maneuvers the aircraft in a direction which assures movement of the reticle 66 to the center of the image 12. In actuality, the reticle 66 remains stationary on the screen 32 and the image 12 moves relative to the screen. The result of the corrective maneuver is witnessed when the center of the image 12 achieves a position substantially contiguous with the reticle 66.

A primary feature of the invention resides in the ability of the instrument 10, for example, during IFR conditions, to display the image 12 as if the pilot were actually viewing the landing site 14. Specifically the image 12 on the screen 32 appears to the pilot as if it were looking at the landing sight 14 through the viewing plane 198 perpendicular to the flight path 16. As seen in FIG. 2, the flight path 10 is illustrative of an approach and landing operation involving a moderate approach angle.

Thus, when the aircraft is yet at a great distance from the landing site 14, the image 12 appears merely as a straight line or as a dot. However, as the aircraft nears the landing site, the image 12 appears as a trapezoid of ever-increasing magnitude. When the aircraft is still at a substantial distance from the landing site 14 (FIG. 4) such that the aircraft's flight path 16' involves a relatively shallow approach angle, the image 12 assumes the shape of a trapezoid having a small height. In contrast, when the aircraft is in close proximity to the landing site 14 and is about to initiate a descent along a flight path 16'' involving a relatively steep approach angle (FIG. 5), the image 12, as seen through a viewing plane 198'' perpendicular to the flight path 16'', is a trapezoid having a substantial height and indeed approaching the shape of a square. At such time that the aircraft touches down, the image 12 fills the entire area bounded by the mark 45 on the screen 32.

It is noteworthy that the vertical cross-pointer 64 always indicates lateral displacement of the aircraft, as represented by the reticle 66, relative to the desired flight path. The horizontal cross-pointer 62 indicates only vertical displacement when the image 12 appears substantially as a straight line or dot. However, as soon as the image 12 beings to assume the shape of a trapezoid, the cross-pointer 62 serves to indicate both vertical and longitudinal displacement of the aircraft relative to the desired flight path.

When the aircraft approaches the landing site 14 in a manner involving only shallow approach angles (FIG. 4) and such that the horizontal cross-pointer 62 substantially indicates vertical displacement of the aircraft from the desired flight path, the vertical speed pointer 84 can be employed in conjunction with the cross-pointer 62 so as to achieve smooth and substantially perfect vertical control. Specifically, the pilot should attempt to maintain the vertical speed pointer 84 in a position substantially colinear with the cross-pointer 62 as he maneuvers the aircraft to return the cross-pointer 62 to a position contiguous with the reticle 66. When the cross-pointer 62 reaches a position contiguous with the reticle 66, the speed pointer 84 indicates zero vertical speed. In this manner, the aircraft will have achieved vertical control smoothly and with a minimum of overshoot or undershoot.

At his option, the pilot can press either the button 120 or the button 122 of the switch 118 depending upon his choice of input information into the instrument 10, namely, either a computer input from the device 104 or a radio input from the device 102. Also, the instrument 10 provides information relating to a plurality of operating conditions of the aircraft, all of which are of interest to the pilot and arranged in a readable manner.

It should be understood that the foregoing disclosure relates only to a preferred embodiment of the invention and that various modifications may be made thereto without departing from the spirit and scope of the information as set forth in the appended claims.

I claim:

1. A flight information system for use in aircraft capable of flying in a variety of controlled flight path modes including horizontal, hovering, and vertical, and comprising means for indicating a desired flight path, operative means for determining the position of said aircraft relative to said desired flight path, means for indicating said relative position, display means responsive to said operative means for visually displaying an analog analog image of a predetermined location related to said flight path, said display means including means for generating said analog image and drive means for continually orienting said image in a plane perpendicular to said flight path regardless of said aircraft's flight path mode.

2. A system as set forth in claim 1 wherein said display means includes a screen, an opaque masking member having an opening therein and movable about a plurality of axes, optical means for projecting an image of said opening onto said screen, said image representing an analog of said predetermined location, and said drive means being responsive to said operative means for maintaining said image in said plane perpendicular to said flight path.

3. A system as set forth in claim 2 wherein said display means includes an image size lens movable intermediate said member and said screen for adjusting the size of image on said screen, and drive means for moving said lens between said member and said screen.

4. A system as set forth in claim 3 wherein said display means includes a positioning lens intermediate said masking member and said screen, said positioning lens being movable about a plurality of axes for positioning the image on said screen, and drive means responsive to displacement of the vehicle from said flight path for moving said positioning lens about said axes.

5. A system as set forth in claim 1 wherein said operative means includes input means responsive to operation of the vehicle and operable for providing information relative to the position of the vehicle with respect to the flight path, computational means responsive to operation of said input means and operable for analyzing the position information with respect to a viewing plane oriented substantially perpendicular to the flight path, and generating means responsive to operation of said computational means for transmitting to said display means display signals which are analog functions of the position information.

6. A system as set forth in claim 5 wherein said computational means include a plurality of electronic circuits for performing logical and computational operations.

7. A system as set forth in claim 4 wherein said input means includes a primary device continuously generating a plurality of primary signals relating to performance of the vehicle and a secondary device continuously generating a plurality of signals relating to performance of the vehicle, and including switch means selectively operable to provide to said system at least one of said primary signals and, alternatively, at least one of said secondary signals.

8. A system as set forth in claim 7 wherein said primary device is a navigation computer and said secondary device is a radio navigation device.

9. A system as set forth in claim 1 wherein said display means includes a screen for displaying an image of said predetermined location, and a first cross-pointer responsive to said operative means and movable across said screen for indicating displacement of the vehicle relative to said flight path, said horizontal cross-pointer indicating vertical displacement when the vehicle is at a first position substantially distant from said predetermined location, indicating longitudinal displacement when the vehicle is at a second position directly above said predetermined location, and indicating a combination of vertical and longitudinal displacements when the vehicle is at a position intermediate said first and second positions.

10. A system of claim 9 including means for measuring said aircraft's vertical speed and means for indicating said vertical speed, said indicating means comprising a pointer slidable in a groove adjacent said screen and being movable colinearly with said horizontal cross-pointer for enabling smooth vertical control of said aircraft.

11. A system as set forth in claim 9 wherein said display means includes a second cross-pointer transverse to said first cross-pointer and movable across said screen for indicating lateral displacement of the vehicle relative to said flight path.

12. A system as set forth in claim 11 wherein said display means includes a reticle on said screen for representing the position of the vehicle and said first and second cross-pointers are mutually perpendicular and represent said flight path at their point of intersection, the displacement of said reticle from said point of intersection representing the displacement of the vehicle from said flight path.

13. A system for displaying information relating to the operation of a vehicle comprising: operative means responsive to operation of the vehicle relative to an intended flight path and operable for determining the position of the vehicle with respect to said flight path, a screen, a masking member having a window representing a predetermined location related to said flight path and mounted for movement about a plurality of axes, projection means for projecting an image of said window onto said screen, said image pictorially depicting said predetermined location as viewed from the vehicle, drive means responsive to said operative means for maintaining said image as if located in a plane perpendicular to said flight path, said image appearing substantially as a dot when the vehicle is at a first position substantially distant from said predetermined location, said image appearing substantially in true shape when the vehicle is at a second position directly above said predetermined location, and said image appearing in perspective when the vehicle is at a position intermediate said first and second positions, and a first cross-pointer responsive to said operative means and movable across said screen for indicating displacement of the vehicle relative to said flight path, said first cross-pointer indicating vertical displacement when the vehicle is at said first position, indicating longitudinal displacement when the vehicle is at said second position, and indicating a combination of vertical and longitudinal displacements when the vehicle is at said intermediate position.

14. A system as set forth in claim 13 including a second cross-pointer transverse to said first cross-pointer and movable across said screen for indicating lateral displacement of the vehicle relative to said flight path.

15. A system as set forth in claim 14 including a reticle on said screen for representing the position of the vehicle and wherein said first and second cross-pointers are mutually perpendicular and represent said flight path at their point of intersection, the displacement of said reticle from said point of intersection representing the displacement of the vehicle from said flight path.